US008191094B2

(12) United States Patent
Azera et al.

(10) Patent No.: US 8,191,094 B2

(45) Date of Patent: May 29, 2012

(54) CHANNEL FILTER FOR A CONTENT PLAYER

(75) Inventors: Frederic Azera, Kirkland, WA (US); Colin Acton, Kirkland, WA (US); Cory Cirrincione, Redmond, WA (US); Michael Hayton, Redmond, WA (US); Erick Fejta, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 11/760,837

(22) Filed: Jun. 11, 2007

(65) Prior Publication Data

US 2008/0307464 A1 Dec. 11, 2008

(51) Int. Cl.
*H04N 5/445* (2011.01)

(52) U.S. Cl. ................. 725/53; 725/56; 725/57; 725/61

(58) Field of Classification Search .................... 725/46, 725/56
See application file for complete search history.

(56) References Cited

U.S. PATENT DOCUMENTS

| | | | | |
|---|---|---|---|---|
| 5,191,423 | A | 3/1993 | Yoshida | |
| 5,523,800 | A | 6/1996 | Dudek | |
| 6,175,362 | B1 | 1/2001 | Harms et al. | |
| 6,636,273 | B1 | 10/2003 | Weber | |
| 6,734,804 | B1 | 5/2004 | Lee | |
| 6,766,526 | B1 | 7/2004 | Ellis | |
| 7,027,108 | B2 | 4/2006 | Kim | |
| 7,057,673 | B1 | 6/2006 | Weber | |
| 2002/0019979 | A1 * | 2/2002 | Koreeda et al. | 725/39 |
| 2005/0204389 | A1 * | 9/2005 | Proehl et al. | 725/60 |
| 2005/0278741 | A1 * | 12/2005 | Robarts et al. | 725/46 |
| 2006/0167859 | A1 * | 7/2006 | Verbeck Sibley et al. | 707/3 |
| 2007/0016923 | A1 * | 1/2007 | Kwon | 725/38 |
| 2007/0061497 | A1 * | 3/2007 | Takatsuka | 711/100 |
| 2007/0067803 | A1 | 3/2007 | Mears et al. | |
| 2008/0060019 | A1 * | 3/2008 | Shikata et al. | 725/56 |

OTHER PUBLICATIONS

Jannotti, "Iconic Text Entry Using a Numeric Keypad", Massachusetts Institute of Technology, pp. 9, Available at least as early as Apr. 19, 2003.

"Remote Control User Guide", available at least as early as Apr. 2, 2007 at <<http://canbytv.com/files/RemoteControlUserGuide.pdf>>, Canby Telcom, pp. 3.

"SX Lite for Easy S CI, Classic S CI and Matrix S receivers", Aug. 23, 2002, pp. 29.

* cited by examiner

*Primary Examiner* — Brian Pendleton
*Assistant Examiner* — Ryan Stronczer
(74) *Attorney, Agent, or Firm* — Alleman Hall McCoy Russell & Tuttle LLP

(57) ABSTRACT

A channel-selection filter. The channel-selection filter helps a user navigate to a desired channel. In particular, the channel-selection filter presents a filtered channel list to the user when the user issues one or more channel-filtering commands. The filtered channel list narrows a list of all available channels to those channels that correspond to the channel-filtering commands issued by the user. When presented with a filtered channel list, the user can select a channel from the filtered channel list. The user can also issue additional channel-filtering commands to further narrow the list of channels presented in the filtered channel list.

18 Claims, 5 Drawing Sheets

CHANNEL FILTER FOR A CONTENT PLAYER

BACKGROUND

Audio-visual content is available for consumption from a seemingly endless number of different content providers. Content providers deliver audio-visual programming to viewers via one or more channels. The various channels can be transmitted using a number of different methods, including over-the-air broadcasts, cable broadcasts, satellite broadcasts, and streaming Internet broadcasts. In some cases, a single content provider can offer two or more channels with each channel delivering different programming. In some cases, a single content provider can offer two or more channels with the same programming, but delivered via different transmission methods.

SUMMARY

A channel-selection filter is provided. The channel-selection filter helps a user navigate to a desired channel. In particular, the channel-selection filter presents a filtered channel list to the user when the user issues one or more channel-filtering commands. The filtered channel list narrows a list of all available channels to those channels that correspond to the channel-filtering commands issued by the user. When presented with a filtered channel list, the user can select a channel from the filtered channel list. The user can also issue additional channel-filtering commands to further narrow the list of channels presented in the filtered channel list.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The present disclosure is directed to a channel filter that facilitates channel selection in a device that plays audio-visual content. The channel filter helps a user find a desired channel by narrowing the list of all available channels to those channels identified by one or more user inputs.

Figure 1:
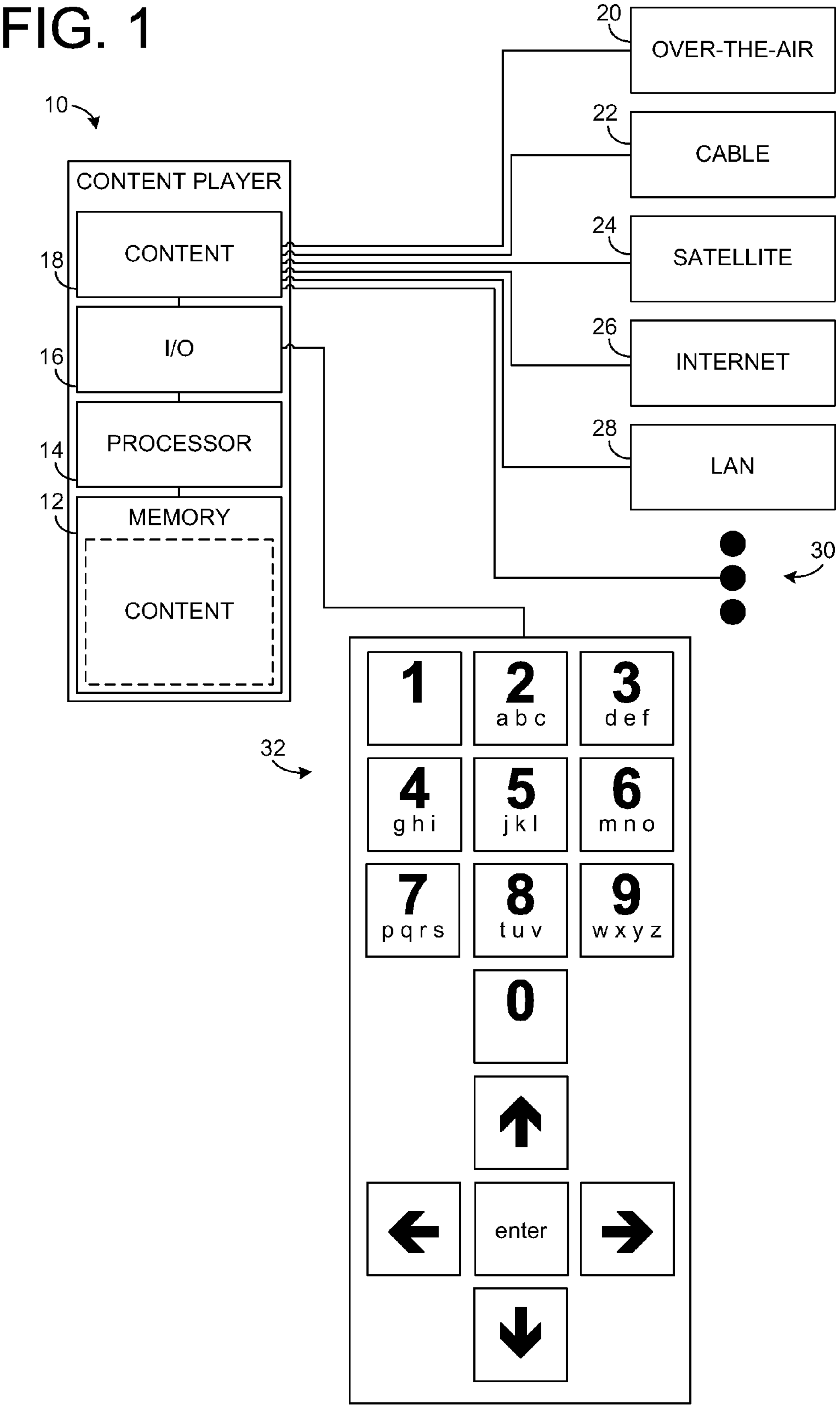
FIG. 1 shows a content player capable of playing content received from a plurality of heterogeneous content sources.

FIG. 1 schematically shows an exemplary content player 10 designed to implement one or more channel filters in accordance with the present disclosure. It should be understood that content player 10 is provided only as one possible device capable of implementing a channel filter. As such, the exemplary configuration of content player 10 should be considered in a nonlimiting sense. Media center computers, televisions, game consoles, set-top boxes, mobile devices, and Internet content playback devices are nonlimiting examples of the various different types of content players that can be configured to implement the herein disclosed channel filter. Such devices may be variously configured without departing from the scope of this disclosure.

Content player 10 is a media center computer that includes a memory 12, a processor 14, an I/O subsystem 16, and a content subsystem 18. Content subsystem 18 is configured to receive audio-visual content from one or more sources. In particular, content subsystem 18 receives content from over-the-air source 20, cable source 22, satellite source 24, Internet source 26, and LAN source 28. As indicated by dots 30, the content subsystem may be further configured to receive content from other sources. It should be understood that a device is not required to receive content from all of the above listed sources. In fact, the herein disclosed channel filter can be used with a device that receives content from a single source or virtually any combination of two or more sources, including homogeneous content sources and/or heterogeneous content sources.

Content subsystem 18 can include one or more tuners for directly receiving content broadcast from a source provider. Content subsystem 18 can additionally or alternatively include an interface for communicating with an external device that receives broadcasts, such as an external cable box or satellite receiver. Furthermore, the content subsystem may include an antenna, or an interface for adding an antenna, to improve reception of wireless signals. The content subsystem can optionally communicate with the Internet and/or another computer network via virtually any suitable wired or wireless connection.

Memory 12 can include volatile memory, nonvolatile memory, or a combination thereof. Nonlimiting examples of devices that can at least partially constitute memory 12 include hard drives, nonvolatile semiconductor memory, volatile semiconductor memory, and optical media.

Content received via content subsystem 18 can be stored in memory 12, although this is not required. Embodiments that are designed to store content in memory 12 can allow a user to time-shift programming so that it can be viewed at the user's convenience. Furthermore, some devices may be designed to record content while other content is being played.

Memory 12 also can be used to store an operating system and/or other software that can be used to implement the herein described channel filter. In other words, memory 12 may include instructions that can be executed by processor 14. When executed, such instructions can filter channels as described below. It should be understood that program filtering instructions are not required to be stored in memory 12.

Among other tasks, processor 14 can manage the recording of content into memory 12. Furthermore, the processor may be used to manage the display of various user interfaces that can help a user control content player 10. As used herein, processor 14 may include one or more hardware and/or firmware devices.

I/O subsystem 16 is designed to receive user inputs, to output or present audio-visual content, and in some embodiments, to output other types of information and/or commands to other devices.

The I/O subsystem can include one or more interfaces for delivering audio-visual information to an external screen and/or sound system. Nonlimiting examples of such interfaces include HDMI, DVI, UDI, VGA, RCA, Component Video, Composite Video, S-Video, SCART, Coaxial Cable, and TOSLINK. In some embodiments, a content player can include one or more built-in screens that are suitable for presenting video content; as well as one or more speakers for presenting audio content.

The I/O subsystem can be designed to receive a variety of different user inputs. FIG. 1 shows a nonlimiting example of a keypad 32 that a user can use to issue such inputs or commands. Such a keypad can be located on a remote control or on the content player itself. Such a keypad can additionally or alternatively be implemented as a virtual keypad (e.g., a keypad presented on a screen).

Keypad 32 includes fifteen keys, although this is not required. The illustrated keypad is only a nonlimiting example of one suitable keypad configuration. Keypads can be designed with virtually any number of different buttons, dials, sliders, switches, soft keys, and/or other controls that can be physically arranged in virtually any pattern. Keypad 32 includes one key for each of the ten unique digits in a base ten number system (i.e., 0, 1, 2, 3, 4, 5, 6, 7, 8, and 9). When a key is pressed or otherwise activated, a user-input corresponding to that key is communicated to the content player. For example, if the 4 key is pressed, a user-input is communicated to the content player in the form of a channel-selection input that is mapped to the number 4.

Some of the number keys also include letters, as demonstrated in the following table:

| NUMBER | LETTERS |
|---|---|
| 2 | a, b, c |
| 3 | d, e, f |
| 4 | g, h, i |
| 5 | j, k, l |
| 6 | m, n, o |
| 7 | p, q, r, s |
| 8 | t, u, v |
| 9 | w, x, y, z |

When a key that includes both a number and one or more letters is pressed or otherwise activated, a user-input corresponding to both the number and the letters of that key can be communicated to the content player. For example, if the 4 key is pressed, a user-input is communicated to the content player in the form of a channel-selection input that is mapped to the number 4 and to the letters g, h, and i.

Keypad 32 also includes an up-arrow key, down-arrow key, left-arrow key, right-arrow key, and enter key. User-inputs are mapped to these keys so that the keys can be used to control the content player. For example, the arrow keys can be used to move a selection cursor, and the enter key can be used to select a highlighted option.

In the past, users have used a keypad to directly enter a complete channel number in order to change the channel being presented by a content player. However, in order to directly enter a complete channel number using this technique, a user had to memorize the complete channel number. Several years ago, memorizing channel numbers was an easily manageable task. However, now there are hundreds, if not thousands, of channels available from a plurality of different sources, with new channels and new sources being added every day. Furthermore, some channels may not be identified by a conventional channel number in the traditional sense. For example, some Internet content may be identified by a "channel" in the form of an IP address and/or a URL. Further complicating the matter, some channels may be associated with different channel numbers depending on the mechanism that is used to broadcast the channel or the format used to broadcast the channel. For example, HBO may be identified as channel 501 on a satellite broadcast and as channel 73 on a cable broadcast. A standard definition broadcast of a local station may be identified as channel 4, while a high-definition digital broadcast of the same channel may be identified as channel 4.1.

As the number of channels available from each source continues to increase, and as the number of different sources increases, it becomes more and more difficult to memorize all channel numbers. Furthermore, some channels that are identified by letters and/or special characters are not easily navigatable using conventional methods. While on-screen program guides are available for finding channels, the use of such guides can be unsatisfying. Conventional program guides require too much time and too many key stokes to perform what should be the simple task of changing a channel.

The herein disclosed channel filter overcomes at least some of the issues associated with memorizing channel numbers, entering channels identified by letters and/or special characters, and/or otherwise navigating a large number of channels in a time efficient and key-stroke efficient manner.

Figure 2:
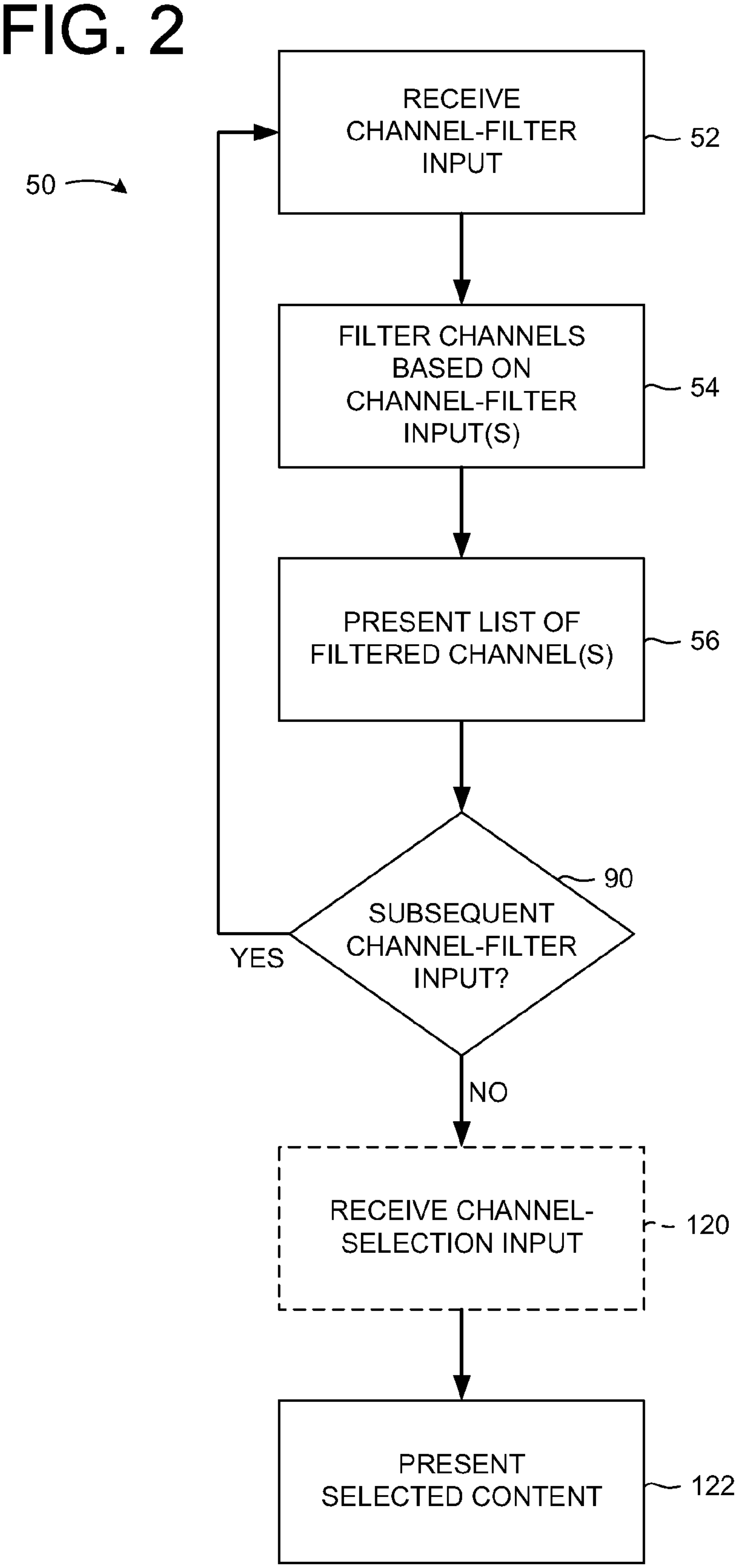
FIG. 2 shows a method for facilitating channel selection.

FIG. 2 shows a nonlimiting example of a channel-filtering method 50 that facilitates channel selection. At 52, the method includes receiving a channel-filter input. As described, a channel-filter input can be received by the I/O subsystem of a content player. The channel-filter input can originate at a remote control, a keypad on a content player, a virtual keypad, and/or another suitable source.

At 54, channel-filtering method 50 further includes filtering channels based on one or more received channel-filter inputs. The results of such filtering can be presented in the form of a filtered channel list, as indicated at 56.

Figure 3:
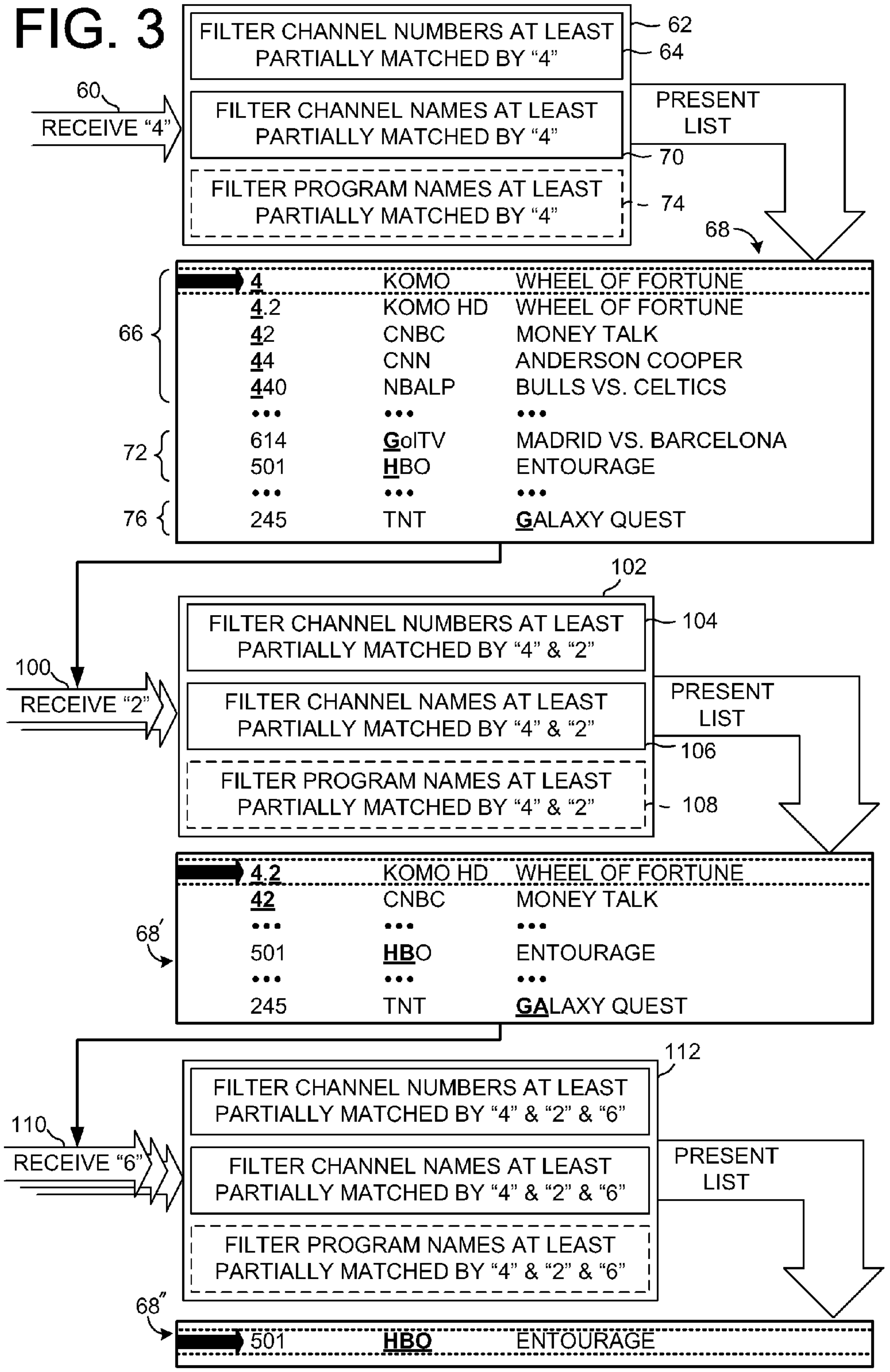
FIG. 3 shows an example implementation of the method of FIG. 2.

FIG. 3 illustrates a nonlimiting example of how channels can be filtered based on channel-filter inputs. In particular, as demonstrated by arrow 60, a content player, or another suitable device, can receive a channel-filter input that is mapped to the number 4 (and the letters g, h, and i). Then, as illustrated in box 62, the content player can filter the channels by channel number, channel name, and/or program name.

As indicated at 64, channel numbers can be filtered by the number to which the received channel-filter input is mapped. In the illustrated example, this is the number 4. As shown at 66, channels that begin with the number 4 are presented as part of a filtered channel list 68. These channels are presented because they at least partially match the number 4. In other words, the number mapped to the first channel-filter input (4) matches the first digit of each filtered channel number (4, 4.2, 42, 44, 440). A channel that does not begin with a 4 is not presented as part of filtered channel list 68 unless that channel qualifies under a different selection criteria, such as channel name matching or program name matching.

As indicated at 70, channel names can be filtered by the letter(s) to which the received channel-filter input is mapped. In the illustrated example, these are the letters g, h, and i. As shown at 72, channels that begin with the letters g and h are presented as part of filtered channel list 68 (no channel names begin with the letter i in this example). In other words, the letters mapped to the first channel-filter input (4=g, h, and i) match the first letter of each filtered channel name (GolTV, HBO). A channel whose name does not begin with g, h, or i is not presented as part of filtered channel list 68 unless that channel qualifies under a different selection criteria, such as channel number matching or program name matching.

As used herein, "filtering by the letters to which a channel-filter input is mapped" includes pretranslating channel names into number equivalents for name searching by number. In other words, the channel name HBO can be pretranslated into the equivalent number 426, where H=4, B=2, and 0=6. The results of such pretranslations can be indexed for subsequent filtering operations. For example, the letters HBO can be indexed as the number 426. In this way, when the number 4 is received as a channel-filter input, all channel numbers beginning with the number 4 can be presented, as can all channel names that begin with any of the letters g, h, or i, as identified in the pretranslation index. Such pretranslating is not required.

As indicated at 74, program names can be filtered by the letter(s) to which the received channel-filter input is mapped. In the illustrated example, these are the letters g, h, and i. As shown at 76, channels with programs that begin with the letter g are presented as part of filtered channel list 68 (no program names begin with the letters h or i in this example). In other words, the letters mapped to the first channel-filter input (i.e., 4=g, h, and i) match the first letter of each filtered program name (Galaxy Quest). A channel having a program name that does not begin with g, h, or i is not presented as part of filtered channel list 68 unless that channel qualifies under a different selection criteria, such as channel number matching or channel name matching.

In one exemplary configuration, the filter presents only those programs that are currently available for viewing. In other words, the filter presents only those programs that are currently being broadcast, are currently available for download or streaming, and/or have previously been downloaded and are currently saved in device memory. In other embodiments, the filter can present programs that are available for future viewing, but which are not yet available for immediate viewing. In such cases, the time at which the program is available for viewing may also be presented.

The above described filtering process can be executed using any suitable technique. As a nonlimiting example, an index of channel numbers, channel names, and/or program names can be stored in device memory, such as memory 12 in FIG. 1. When a channel-filter input is received, a processor, such as processor 14 in FIG. 1, can execute a matching algorithm to identify those channel numbers, channel names, and/or program names that correspond to the received channel-filter input. As mentioned above, letters from channel names and program names can be pretranslated into number equivalents for name searching by number.

Figure 4:
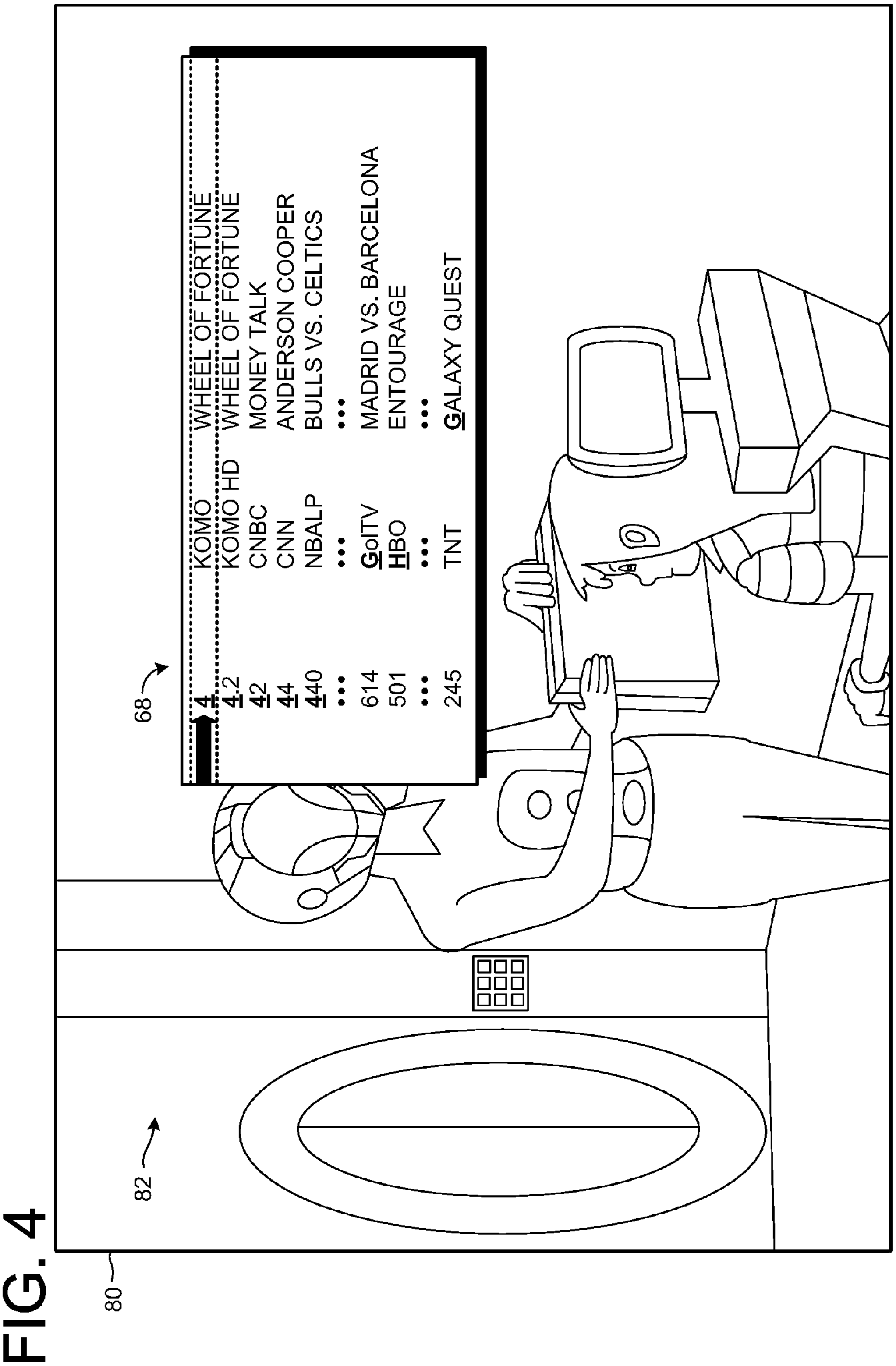
FIG. 4 shows a filtered channel list presented with audio-visual content.

Channel-filter inputs can be received in real-time while viewing full-screen, audio-visual content. Furthermore, the results of channel filtering can be presented in real-time with full-screen, audio-visual content. For example, FIG. 4 shows a screen 80 that is presenting a live television broadcast 82. The screen is also presenting filtered channel list 68 as an overlay to the currently playing programming. Filtered channel list 68 is presented responsive to receiving a channel-filter input (4). In other words, a single key stroke initiates the process. A program guide does not have to be accessed through a plurality of key strokes before beginning the channel-filtering process. Therefore, the channel selection process of the present disclosure is fast and efficient when compared to other known methods, while at the same time greatly improving the ability to deal with a large number of channels. Filtered channel lists need not be presented as overlays of full-screen programming in all embodiments. Another example presentation format is a split screen format in which programming is displayed in one portion of the screen, while the filtered channel list is presented in another portion of the screen.

Turning back to FIG. 2, at 90, channel-filtering method 50 includes determining if there are subsequent channel-filter inputs. If a subsequent channel-filter input is received, the channels are filtered based on the cumulative channel-filter inputs. In other words, after the first channel-filter input is received, subsequent channel-filter inputs may be received and processed so that the filtered channel list is progressively filtered. In this way, a user can narrow the list of available channels with each subsequent channel-filter input. The first channel-filter input and all subsequent channel-filter inputs, if any, can be referred to as cumulative channel-filter inputs.

A subsequent channel-filter input is schematically illustrated by arrow 100 of FIG. 3. This channel-filter input is mapped to the number 2 (and the letters a, b, and c). As shown at box 102, the channels can be progressively filtered by channel number, channel name, and/or program name.

As indicated at 104, channel numbers can be filtered by the numbers to which the cumulative channel-filter inputs are mapped. For example, the number mapped to the first channel-filter input (4) matches the first digit of each filtered channel number, and the number mapped to the second channel-filter input (2) matches the second digit of each filtered channel number. In this example, channels 4.2 and 42 are the only channel numbers that match the cumulative channel-filter inputs.

As indicated at 106, channel names can be filtered by the letter(s) to which the cumulative channel-filter inputs are mapped. For example, the letters mapped to the first channel-filter input (4=g, h, and i) match the first letter of each filtered channel name, and the letters mapped to the second channel-filter input (2=a, b, and c) match the second letter of each filtered channel name. In this example, HBO is the only channel name that matches the cumulative channel-filter inputs.

As indicated at 108, program names can be filtered by the letter(s) to which the cumulative channel-filter inputs are mapped. For example, the letters mapped to the first channel-filter input (4=g, h, and i) match the first letter of each filtered program name, and the letters mapped to the second channel-filter input (2=a, b, and c) match the second letter of each filtered program name. In this example, Galaxy Quest is the only program name that matches the cumulative channel-filter inputs.

As shown in FIG. 3, progressively filtered channel list 68' presents the channels as narrowed by the first two cumulative channel-filter inputs.

Subsequent channel-filter inputs can result in further progressive filtering. For example, as demonstrated by arrow 110, a third cumulative channel-filter input can be received. This channel-filter input is mapped to the number 6 (and the letters m, n, and o). As shown at box 112, the channels can be filtered by channel number, channel name, and/or program name, as described above. In this case, progressively filtered channel list 68" presents the channels as narrowed by the first three cumulative channel-filter inputs. Progressively filtered channel list 68" includes a single option, because HBO is the only channel name that matches the cumulative channel-filter inputs. There is not a channel number or program name that matches the cumulative channel-filter inputs in this example.

When a filtered channel list is narrowed to a single option, the content corresponding to that option can be automatically presented. In other words, the channel may be changed to display the programming from the selected channel. Such automatic selection can be performed immediately after the filtered channel list is narrowed to a single option, or a predetermined time after the filtered channel list is narrowed to a single option (e.g., 1 second delay). In the illustrated example, channel 501 is automatically presented.

It should be understood that automatic selection is not required. The channel filter can be configured so that the channel changes after a channel-selection input is received.

As described above, number keys 4, 2, and 6 are used to navigate to channel 501. According to the present disclosure, a user can navigate to channel 501 only by knowing that that channel is named HBO. The user does not need to know that HBO is channel 501. Furthermore, the user can navigate to a three digit channel by pressing a total of three buttons. In some cases, fewer buttons can be pressed. It is not necessary to first navigate to a program guide or other channel selection aid.

Returning to FIG. 2, at 120, channel-filtering method 50 includes receiving a channel-selection input. As used herein, channel-selection inputs can include inputs that aid in the selection of a channel from the progressively filtered channel list. A nonlimiting example of a channel-selection input includes an input mapped to an arrow key that moves a selection cursor through the channels in a filtered channel list. Another example channel-selection input is an input mapped to an enter key that selects the channel to which a selection cursor has been moved.

Channel-filtering method 50 further includes presenting a selected channel, as indicated at 122. Presenting a selected channel can include immediately presenting the selected channel by changing the channel to display content from the selected channel. Presenting a selected channel can additionally or alternatively include recording the selected content from the selected channel for playback at a later time.

Figure 5:
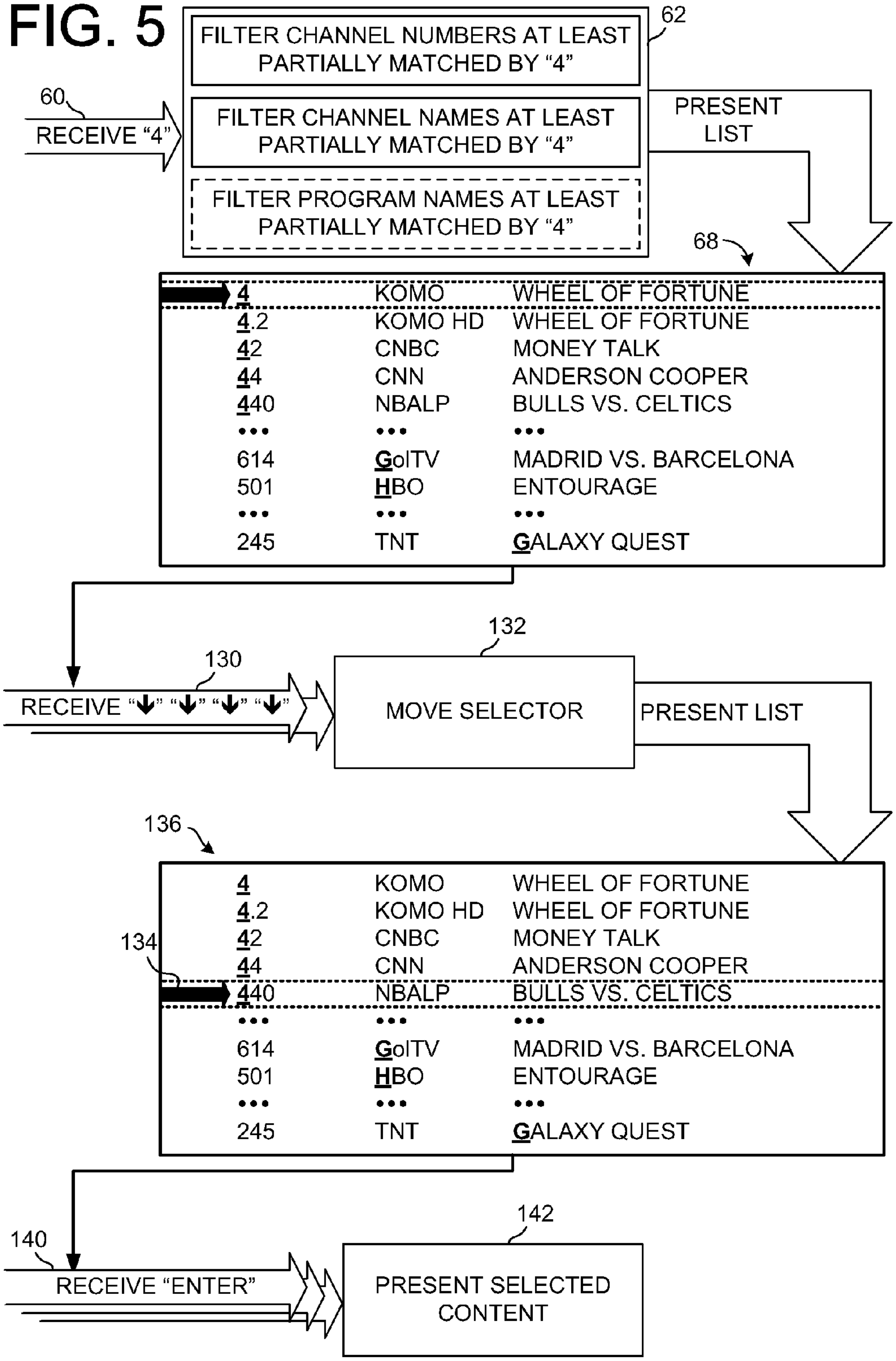
FIG. 5 shows another example implementation of the method of FIG. 2.

FIG. 5 shows an example in which, after channel-filter input 60 is received and filtered channel list 68 is presented, four consecutive channel-selection inputs are received. In particular, arrow 130 indicates reception of four down-arrow channel-selection inputs. As shown at box 132, the down-arrow inputs move a selector. In particular, a selection cursor 134 moves down four spots to highlight the fifth item in filtered channel list 136.

A final channel-selection input is schematically illustrated by arrow 140 of FIG. 5. This channel-selection input is mapped to the enter key. As shown at box 142, the selected content can be presented responsive to reception of this channel-selection input. In this case, channel 440 is presented, because that is the channel that was highlighted when the enter channel-selection input was received.

It should be understood that channel filters according to the present disclosure can be configured so that a highlighted selection is automatically presented after a predetermined delay. In this way, the enter key does not need to be used.

While the present disclosure has used letters from the English language alphabet and base-ten numbers to illustrate an exemplary channel filter, it should be understood that the disclosed filter can operate on other types of letters, numbers, characters, and/or symbols, and the disclosed filter can be applied to objects other than channel lists. As a nonlimiting example, a language other than English can be used, and the symbols and/or characters that are used with such a language can be progressively input to narrow a list. In some cases, two or more inputs can be used to represent a single character and/or word. For example, a phonetic representation of a Chinese language symbol can be entered as a pin-yin using one or more inputs, and the resulting Chinese language symbol can be used to filter phrases at least partially matched by that symbol.

Although the subject matter of the present disclosure has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of facilitating channel selection, comprising:

receiving at a content player device one or more cumulative channel-filter inputs, each cumulative channel-filter input mapped to both a number and a letter;

in response to receiving a first of the one or more cumulative channel-filter inputs, overlaying by the content player device a filtered channel list with currently playing video content, the filtered channel list including content currently available for viewing and content that is not currently available for viewing but is available for future viewing, the filtered channel list including channels having a channel number at least partially matched by one or more numbers to which the cumulative channel-filter inputs are mapped, channels having a channel name at least partially matched by one or more letters to which the cumulative channel-filter inputs are mapped, and channels having a program name at least partially matched by one or more letters to which the cumulative channel-filter inputs are mapped;

in response to receiving each of the one or more cumulative channel-filter inputs, progressively filtering the filtered channel list to include only channels identified by the cumulative channel-filter inputs received;

visually emphasizing in the filtered channel list the appearance of filtered letters or numbers at least partially matching a filtered channel number, channel name, or program name relative to the appearance of letters or numbers in the filtered channel list that do not match the filtered channel number, channel name, or program name; automatically playing or recording content from a channel after the filtered channel list is narrowed to only that channel, the content being automatically played without receiving further user selections if that content is currently available for viewing, and the content being automatically recorded when available without receiving further user selections if that content is not currently available for viewing but is available for future viewing;

wherein the filtered channel list includes:

a number list of channels having a channel number that matches the one or more cumulative channel-filter input;

a name list of channels having a channel name that matches the one or more cumulative channel-filter inputs;

a current list of channels having a current program that matches the one or more cumulative channel-filter inputs, and the number list, the name list, and the current list are each shown separately and simultaneously in the filtered channel list.

2. The method of claim 1, where overlaying the filtered channel list includes presenting channels from a plurality of heterogeneous content sources.

3. The method of claim 2, where the plurality of heterogeneous content sources includes an Internet content source including one or more channels identified by an IP address and/or a URL, the one or more channels configured to stream the content.

4. The method of claim 2, where the plurality of heterogeneous content sources includes a cable content source.

5. The method of claim 2, where the plurality of heterogeneous content sources includes a satellite content source.

6. The method of claim 1, further comprising receiving a channel-selection input and selecting a channel from the filtered channel list based on the channel-selection input.

7. A method of facilitating channel selection, comprising:

receiving a first channel-filter input while presenting video content, the first channel-filter input being mapped to both a number and a letter;

in response to receiving the first channel-filter input, overlaying a filtered channel list on the video content, the filtered channel list including:

channels having a channel number at least partially matched by the number to which the first channel-filter input is mapped, each of the channels having a matching channel number being ordered in a number list in the filtered channel list, channels having a channel name at least partially matched by the letter to which the first channel-filter input is mapped, each of the channels having a matching channel name being ordered in a name list in the filtered channel list, channels having a currently available program with a program name at least partially matched by the letter to which the first channel-filter input is mapped, each of the channels having a matching currently available program being ordered in a current list in the filtered channel list, and channels having a future program that is not currently available but which is available for future viewing, the future program having a program name at least partially matched by the letter to which the first channel-filter input is mapped, and the number list, the name list, and the current list being shown separately and simultaneously in the filtered channel list;

visually emphasizing in the filtered channel list the appearance of filtered letters or numbers at least partially matching a filtered channel number, channel name, or program name relative to the appearance of letters or numbers in the filtered channel list that do not match the filtered channel number, channel name, or program name; and playing content from a channel selected from the filtered channel list if that content is currently available for viewing, and recording that content for playback at a later time if that content is not currently available for viewing but is available for future viewing.

8. The method of claim 7, where overlaying the filtered channel list includes presenting channels from a plurality of heterogeneous content sources.

9. The method of claim 8, where the plurality of heterogeneous content sources includes at least an Internet content source.

10. The method of claim 7, further comprising:

receiving one or more subsequent channel-filter inputs, each subsequent channel-filter input mapped to both a number and a letter; and in response to receiving each subsequent channel-filter input, progressively filtering the filtered channel list to include:

channels having a channel number at least partially matched by numbers to which the first channel-filter input and subsequent channel-filter inputs are mapped, channels having a channel name at least partially matched by letters to which the first channel-filter input and subsequent channel-filter inputs are mapped, channels having a currently available program with a program name at least partially matched by letters to which the first channel-filter input and subsequent channel-filter inputs are mapped, and channels having a future program with a program name at least partially matched by letters to which the first channel-filter input and subsequent channel-filter inputs are mapped.

11. The method of claim 7, further comprising pretranslating channel names into number equivalents for channel name searching by number.

12. The method of claim 7, further comprising pretranslating program names into number equivalents for program name searching by number.

13. The method of claim 7, where the letter to which the first channel-filter input is mapped is one of a plurality of letters to which the first channel-filter input is mapped.

14. A memory storage device comprising machine executable instructions that, when executed, provide for:

displaying currently playing video content without displaying a channel list;

receiving one or more cumulative channel-filter inputs while displaying the currently playing video content without displaying the channel list;

responsive to receiving a first of the one or more cumulative channel-filter inputs, overlaying a filtered channel list on the currently playing video content, the filtered channel list including only channels identified by the first cumulative channel-filter input, and the filtered channel list including content currently available for viewing and content that is not currently available for viewing but is available for future viewing;

responsive to receiving each of the one or more cumulative channel-filter inputs after the first cumulative channel-filter input, progressively filtering the filtered channel list to include only channels identified by the cumulative channel-filter inputs received;

visually emphasizing in the filtered channel list the appearance of filtered letters or numbers serving as filtering criteria relative to the appearance of letters or numbers in the filtered channel list that do not match the filtering criteria; and automatically playing or recording content from a channel after the filtered channel list is narrowed to only that channel, the content being automatically played without receiving further user selections if that content is currently available for viewing, and the content being automatically recorded when available without receiving further user selections if that content is not currently available for viewing but is available for future viewing, and not automatically playing or recording content from a channel when the filtered channel list includes more than one channel.

wherein the filtered channel list includes:

a number list of channels having a channel number that matches the one or more cumulative channel-filter input;

a name list of channels having a channel name that matches the one or more cumulative channel-filter inputs;

a current list of channels having a current program that matches the one or more cumulative channel-filter inputs, and the number list, the name list, and the current list are each shown separately and simultaneously in the filtered channel list.

15. The memory storage device of claim 14, where each cumulative channel-filter input is mapped to both a number and a letter, and where the filtered channel list includes channels having a channel number at least partially matched by one or more numbers to which the cumulative channel-filter inputs are mapped, and channels having a channel name at least partially matched by one or more letters to which the cumulative channel-filter inputs are mapped.

16. The memory storage device of claim 14, where the filtered channel list includes channels having a currently available program or a future program with a program name at least partially matched by one or more letters to which the cumulative channel-filter inputs are mapped.

17. The method of claim 1, further comprising:

not automatically playing or recording content from a channel when the filtered channel list includes more than one channel.

18. The method of claim 7, further comprising:

automatically playing or recording content from a channel after the filtered channel list is narrowed to only that channel, the content being automatically played without receiving further user selections if that content is currently available for viewing, and the content being automatically recorded when available without receiving further user selections if that content is not currently available for viewing but is available for future viewing, and not automatically playing or recording content from a channel when the filtered channel list includes more than one channel.

* * * * *